May 25, 1954  G. W. MERRITT  2,679,213
RERAILING APPARATUS FOR RAILWAY VEHICLES
Filed June 6, 1951  2 Sheets-Sheet 1

Glenn W. Merritt
INVENTOR

BY W. S. McDowell
ATTORNEY

May 25, 1954  G. W. MERRITT  2,679,213

RERAILING APPARATUS FOR RAILWAY VEHICLES

Filed June 6, 1951  2 Sheets-Sheet 2

Glenn W. Merritt
INVENTOR

BY M. S. McDowell
ATTORNEY

Patented May 25, 1954

2,679,213

UNITED STATES PATENT OFFICE 2,679,213

RERAILING APPARATUS FOR RAILWAY VEHICLES

Glenn W. Merritt, Bowerston, Ohio, assignor to The Nolan Company, Bowerston, Ohio, a corporation of Ohio Application June 6, 1951, Serial No. 230,139

1 Claim. (Cl. 104—270)

This invention relates to rerailing devices of the type adapted for restoring derailed track vehicles to operative positions on associated track rails.

Ramp-type rerailers of conventional track-rail-straddling design, have been found to be structurally objectionable in certain important respects. Among these objections has been the failure of such rerailers to maintain fixed operating positions in connection with associated track rails. This is particularly true when the flanged truck wheels of railroad vehicles ascend the ramp surfaces of such rerailers. Again, under these conditions, the rerailers often tend to rock and become unstable in relation to associated track rails when subjected to the influence of the relatively great weights imposed thereon by engaging rolling stock. Such instability is attributable in large part to the failure of prior devices to securely lock or fasten the rerailers in fixed relationship to associated track rails, and to accomplish this end in a manner precluding undesired longitudinal sliding movement of the rerailers with respect to the track rails, or the bodily lifting of the rerailers from the track rails as a result of rocking movement thereof, or other causes tending to produce inoperative positions of the rerailers.

Such rerailers normally provide outer wheel-guiding ramp ribs which often are so disposed as to unduly contact the truck frames of wheeled rail vehicles passing thereover in a manner interfering seriously with rerailing operations. Again, the rerailers fail in many instances to elevate the track-engaging flanges of wheels to planes above those defining the wheel-engaging top surfaces of track rail head flanges. Under these conditions, difficulty is encountered in guiding pairs of rigidly united axle-joined truck wheels disposed on the outer side of track rails laterally of and over the tops of the rails into normal position in which the wheel flanges are disposed on the inner sides of the rails. Often in this operation, the contacting of a wheel flange with an outer side surface of a track rail prevents the truck from shifting laterally unless the obstructing flange is lifted sufficiently to clear the track rail.

With these and other objections in view, the present invention has for a general object to provide an improved rerailer in which the objections noted, among others, in the construction of conventional rerailers are eliminated, and an improved means provided for quickly, safely and surely guiding derailed truck wheels into their normal operative positions on the rails of a trackway.

Another object of my invention is to provide a car rerailer or replacer wherein the body of the appliance is provided with an improved easily inserted and removed locking wedge by which the rerailer is positively maintained in fixed operative association with a track rail and held positively against longitudinal shifting movement with respect thereto.

A further object of the invention is to provide a rerailer appliance for track-mounted rolling stock in which the appliance comprises a body formed to straddle an associated track rail, and wherein the body presents on each side of the associated rail a pair of wheel-receiving and guiding ramps formed with widened and lower wheel-entering portions and converging elevated wheel-discharging regions.

An additional object is to provide a rerailer in which the body of the appliance on the inside of an associated trackway is formed with an upstanding guide flange, and that part of the body presented to the outside of the trackway is devoid of a complemental upstanding flange or rib, since I have found that such outer ribs often act as obstructions when disposed in the path of truck frames passing thereover and particularly so since in the present invention their guiding function is not required.

A further object of the invention is to provide rerailers of the character set forth wherein the elevated ramp-merging surfaces are so formed at their wheel-exiting portions as to provide for the safe and smooth transit of truck wheels from the rerailing appliances onto the head flanges of associated track rails without jar or injury to equipment.

Still a further object of the invention is to provide a rerailing appliance having a body formed with downwardly and outwardly diverging ramps arranged on each side of an associated rail, and wherein the outer of said ramps is formed intermediately of its length with a convex lifting enlargement, the latter being sufficiently upstanding so that a truck wheel passing thereover has its rail-engaging flange so elevated and positioned as to clear the upper surface of the rail head, whereby to allow unobstructed lateral movement of the truck wheel as the same is undergoing alignment with the head flange of an associated rail.

Again, a further object of the invention is to provide a ramp-type rerailer of the character indicated at the forward and lower end thereof with means engaging the under surface of the base flange of an associated track rail, whereby to prevent in a positive manner elevation or other tilting or rocking movement of the forward wheel-entering portion of the appliance when the same is subjected to the weight of rolling stock passing thereover.

Still a further object of the invention is to provide a rerailer adapted for use in connection with heavy locomotives and other rolling equipment of railroads, and wherein the rerailing appliance is capable of withstanding severe usage without injury as a result of the weights imposed thereon by such heavy vehicles, the rerailer possessing such size and weight as to enable the same to be carried by workmen, placed in position on a trackway or stored away when not in use.

Other objects of the invention will appear in the following detailed description taken in connection with the accompanying drawings, and wherein.

Figure 1:
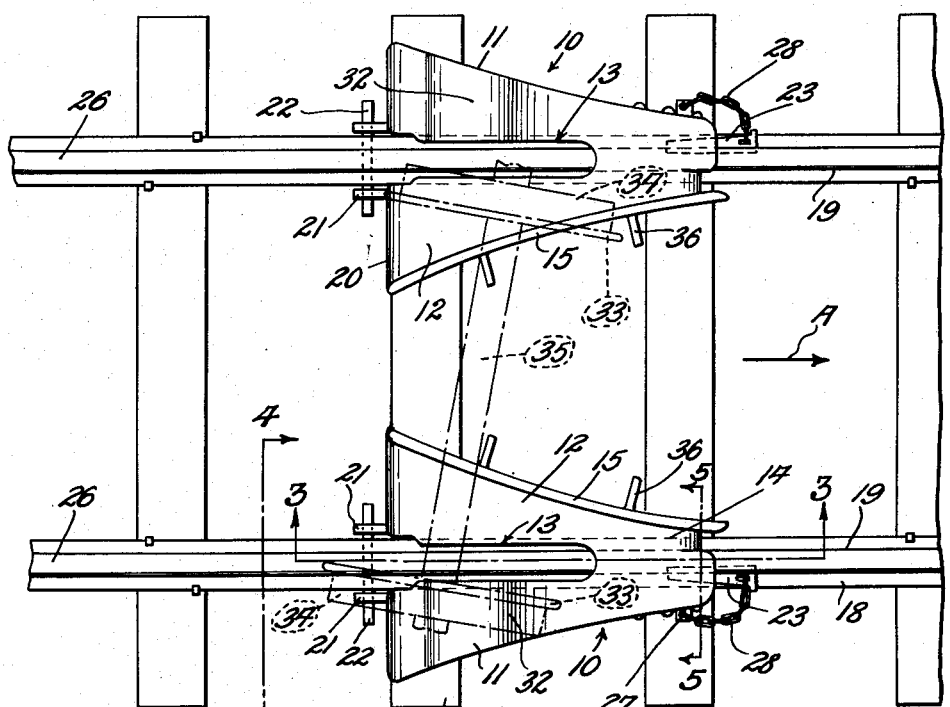
Fig. 1 is a top plan view disclosing a set of the improved rerailing appliances of the present invention in their applied track-mounted positions.

Referring more particularly to the drawings, my improved car rerailers or replacers are indicated in their entirety by the numeral 10. The same are sold and used in pairs, as shown in Fig. 1, one being commonly called the left hand rerailer and the other the right hand. Structurally, the rerailers are similar, the left hand one being a reversal, side for side, of the right one.

Each rerailer comprises an integral metallic body, preferably of cast steel. The body is formed to present two downwardly inclined and outwardly diverging ramp-forming wings 11 and 12, respectively, separated from each other by a longitudinally extending opening or slot 13, the wings being joined at their upper ends by an elevated substantially level bridge part 14. The latter is shaped to gradually ease a car wheel down onto the rail and to reduce to a minimum the distance which the wheel will drop in moving off the bridge part of the rerailer onto the rail, thus rendering unnecessary damage to the journal brasses of mine or railroad locomotives. The wings possess an increasing width forwardly and downwardly of each rerailer. On the inner edge of the inner wing 12, there is an upstanding guide flange or rib 15, which extends the whole length of each replacer or rerailer, and which traverses, at its upper portion, the bridge part 14. It will be noted that the outer wing 11 is plain or smooth along its outer edge and devoid of upstanding guide ribs or flanges of the type shown at 15.

It has been found that when such outer ribs or flanges are used, the same quite often interfere with wheel movement over the rerailers by virtue of obstructing contact between such outer ribs and the wheel-carrying truck frames 33a of track vehicles. In the present invention, such obstruction is precluded by the elimination of the outer rib, and by utilizing the full length inner ribs of both the right and left replacers to guide the axle connected vehicle wheel.

The forward, widened and lower end of each rerailer is formed with a flattened surface 16 which engages with the upper surface of an associated track tie 17, or with the base flange 18 of an associated track rail 19. Also, the widened forward edge of each rerailer includes a transversely extending down-turned lip 20 which engages with a vertical side wall of a tie 17 to resist longitudinal movement of the rerailer on the track rail 19 in the direction of wheel movement, indicated by the arrow A. In this instance, the lip 20 is provided with a pair of integral forwardly projecting apertured lugs 21 which, when the rerailer occupies its operative position in association with a rail, are adapted to receive a removable fastening rod or pin 22. The latter, passing beneath the rails 19, serves to prevent upward movement of the associated rerailer, and, also, to preclude undesired rocking thereof on an associated rail, as well as preventing other lack of stability on the part of the rerailer in maintaining its operative position in connection with track rails.

Figure 5:
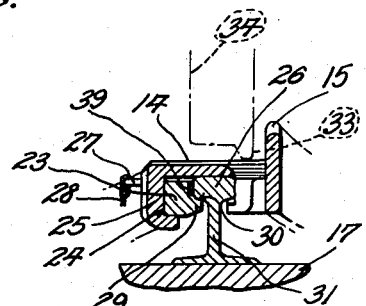
Fig. 5 is a detailed vertical transverse sectional view taken on the plane indicated by the line 5—5 of Fig. 1.
Figure 6:
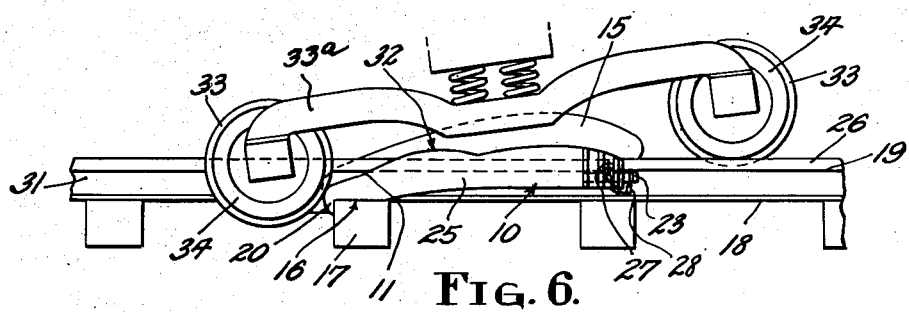
Fig. 6 is a side elevational view showing the rerailer of the present invention in its operative position and illustrating a wheeled truck when passing thereover.

The rear end of each rerailer is fastened to an associated rail by the provision of a wedge bar shown at 23. This bar is slidably received in a socket 24 formed by the spaced relationship, as shown in Fig. 5, provided between a depending outer wall 25 of each rerailer and the head flange 26 of each track rail 19. Projecting from the outer surface of the wall 25, near the rear end of the rerailer, are apertured reinforcing ears 27. To these ears there is connected one end of a chain 28, the other end of said chain being joined to the outer or larger end of each wedge bar 23. The inner surface of each wedge bar is longitudinally ribbed as at 29 to present a shoulder 30, which engages with the under surface of the head flange 26 of the rail 19, adjacent the line of joinder between said head flange and the upper part of the vertical rail web 31.

When the wedge bar is driven tightly into its socket 24, the same frictionally grips the side of an associated rail in a manner securely holding the rerailer against longitudinal movement relative to the rail 19, and also in a manner preventing raising or lowering of the rear or wheel-discharging end of the rerailer with respect to the associated track rail.

Figure 2:
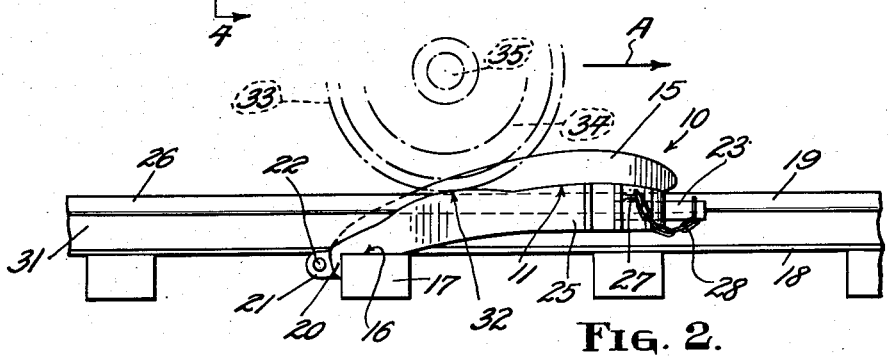
Fig. 2 is a side elevational view.
Figure 8:
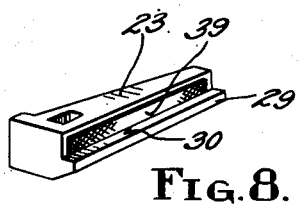
Fig. 8 is a detail perspective view of the locking wedge.
Figure 3:
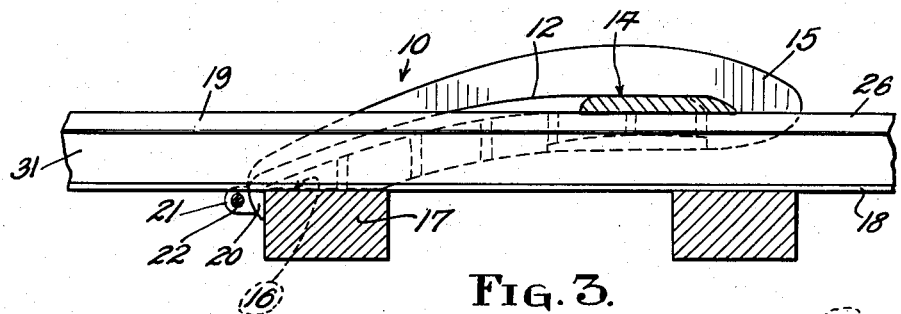
Fig. 3 is a vertical longitudinal sectional view taken through one of the appliances on the plane indicated by the line 3—3 of Fig. 1.
Figure 4:
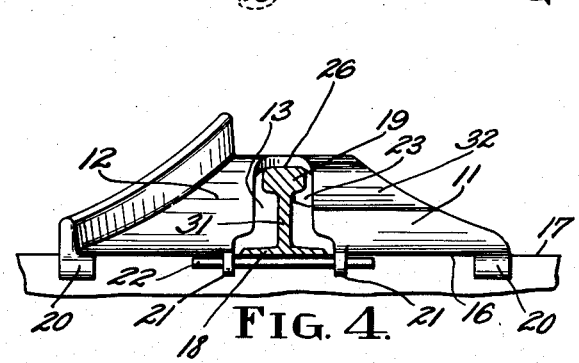
Fig. 4 is a transverse vertical sectional view taken through a track rail on the line 4—4 of Fig. 1, and disclosing in front elevation the wheel-entering portions of my improved ramp-type rerailer.

Another feature of importance resides in providing the right wing 11 of each rerailer or replacer, intermediately of the length thereof, with an upstanding wheel-lifting convexity 32. As shown more particularly in Figs. 1 and 2, when the flange 33 provided peripherally on a car wheel 34 is in contact with the convexity, the said wheel is elevated sufficiently so that the outer edges of its flange 33 are disposed in a plane above that of the top surfaces of the rail head flange 26. Since the car wheels 34 are rigidly united by a common axle 35, lateral movement of such a wheel assembly, when one of the wheels is in contact with the convexity 32, will not find obstruction on the part of the rail head, as might be the case if the convexity were not present, since otherwise the flange on the outer wheel of the assembly would engage with the side of the rail head and prevent such lateral movement. By virtue of this construction positive and non-binding rerailment of car wheels is provided by the present invention.

Figure 7:
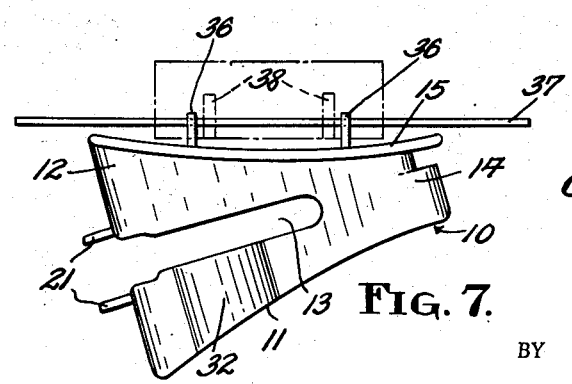
Fig. 7 is a detail elevational view disclosing the carrying and supporting lugs for the rerailer in the handling and storing of the same.

As shown in Figs. 1 and 7, particularly, the inner side of each rerailer may be equipped with apertured lugs 36 for the removable reception of a supporting bar or rod 37. By this bar or rod a rerailer may be conveniently carried from place to place by workmen, or the same may be attached to vehicle-carried bracket hooks 38 when not in use, and placed in out-of-the-way yet conveniently accessible positions. In its transverse cross section, the inner and under surfaces of each rerailer are so formed as to be spaced from the base flanges, spikes, fish plates and chair plates employed in supporting and uniting track rails on cross ties, so that such rail-fastening means will not interfere with locating the rerailer in its operating positions. The inner surfaces of the wedge bar 23, above the shoulder 30 thereon, may be recessed for the reception of a fibrous insert 39, the latter advantageously being composed of such materials as those employed in the formation of motor vehicle brake linings, whereby to enable the inserts to grip effectively the adjoining surfaces of a track rail in holding the rerailer against slippage.

In view of the foregoing, it will be seen that the present invention provides an improved ramp-type rerailer having a body structure so formed that each rerailer straddles an associated track rail. The wide forward and lower end of each rerailer rests on the base flange of an associated track rail or on the upper surface of a supporting cross tie, while the narrower upper end of the rerailer is positioned on the top of the track rail. A derailed truck wheel, through the construction of the rerailer, is caused to ascend the gradual slope provided by one of the ramp ways, so that the wheel will be forced back onto the rail by the guiding surfaces provided by the ramp way. The rerailer can be used anywhere on a track regardless of ties, fish plates and the like.

My improved rerailers are used in a pair of right and left hand units and will retrack wheels from either or both sides of the rails at the same time, for example, the wheel arrangement shown by dotted lines in Fig. 1. Abnormally high wheel flanges or truck frames do not interfere in this operation.

While the preferred form of the invention has been set forth in considerable detail, nevertheless it will be understood that the construction is subject to certain variations or modifications without departing from the spirit and scope thereof as set forth in the following claim.

I claim:

A car rerailer comprising a substantially triangular plate-like body designed to straddle a track rail, said body including integrally joined downwardly and outwardly diverging inner and outer ramps, the latter merging at their upper ends in a relatively narrow bridge portion arranged over and in registry with the head flange of the associated track rail, the forward portion of said rerailer being longitudinally slotted between said ramps to receive the track rail, downturned tie-engaging lips formed in the forward edges of said ramps, apertured ears projecting forwardly from said lips, and a rod removably received in the apertures of said ears, said rod being arranged to pass beneath the associated rail when operatively positioned.

References Cited in the file of this patent

UNITED STATES PATENTS

| Number | Name | Date |
|---|---|---|
| 456,780 | Sherman | July 28, 1891 |
| 493,308 | Stein | Mar. 14, 1893 |
| 514,816 | Debose | Feb. 13, 1894 |
| 683,223 | Pritchard | Sept. 24, 1901 |
| 735,266 | Johnson | Aug. 4, 1903 |
| 1,409,970 | Riddell | Mar. 21, 1922 |

FOREIGN PATENTS

| Number | Country | Date |
|---|---|---|
| 529,774 | France | Dec. 6, 1921 |
| 653,565 | France | Mar. 22, 1929 |